United States Patent
Togare et al.

(10) Patent No.: US 7,888,815 B2
(45) Date of Patent: Feb. 15, 2011

(54) AC/DC POWER SUPPLY, A METHOD OF DELIVERING DC POWER AT MULTIPLE VOLTAGES AND A COMPUTER DATA STORAGE SYSTEM EMPLOYING THE POWER SUPPLY OR THE METHOD

(75) Inventors: Radhakrishna Togare, Vancouver, WA (US); Gregory P. Shogan, Round Rock, TX (US)

(73) Assignee: LSI Corporation, Milpitas, CA (US)

( * ) Notice: Subject to any disclaimer, the term of this patent is extended or adjusted under 35 U.S.C. 154(b) by 218 days.

(21) Appl. No.: 12/347,910

(22) Filed: Dec. 31, 2008

(65) Prior Publication Data

US 2010/0164280 A1    Jul. 1, 2010

(51) Int. Cl.
*H02J 3/14* (2006.01)
(52) U.S. Cl. .................................................. 307/17
(58) Field of Classification Search ............ 307/17; 363/74; 323/267
See application file for complete search history.

(56) References Cited

U.S. PATENT DOCUMENTS

| | | | | |
|---|---|---|---|---|
| 5,210,443 A | * | 5/1993 | Kugler | 307/17 |
| 5,568,372 A | * | 10/1996 | Smith | 363/74 |
| 6,169,648 B1 | * | 1/2001 | Denvir et al. | 361/25 |
| 7,696,733 B2 | * | 4/2010 | Osaka | 323/267 |

OTHER PUBLICATIONS

Fairchild Semiconductor 2003; Application Note AN4140 Transformer Design Consideration for off-line Flyback Converters using Fairchild Power Switch; 11 Pages.

* cited by examiner

*Primary Examiner*—Albert W Paladini

(57) ABSTRACT

An AC/DC power supply, a method of delivering DC power at multiple voltages and a computer data storage system. In one embodiment the AC/DC power supply includes: (1) a transformer having a primary winding couplable to an AC power source and a secondary winding inductively couplable to the primary winding and (2) multiple DC voltage rails coupled to the secondary winding at designated locations and configured to deliver power to loads coupled thereto, each of the DC voltage rails configured to dynamically transfer therebetween an available portion of the power in response to changes in the loads.

20 Claims, 2 Drawing Sheets

AC/DC POWER SUPPLY, A METHOD OF DELIVERING DC POWER AT MULTIPLE VOLTAGES AND A COMPUTER DATA STORAGE SYSTEM EMPLOYING THE POWER SUPPLY OR THE METHOD

TECHNICAL FIELD

This application is directed, in general, to power supplies and, more specifically, to an AC/DC power supply having multiple DC output rails.

BACKGROUND

Computers or computer systems include multiple devices that cooperate to process and store data. User interfaces, microprocessors, memory and disk drives are examples of some of the devices used in a computer system to manipulate and store the data. Often the various devices used in a computer system operate at different voltages. Typically, the operating voltages required are DC voltages. For example, the motors of disk drives may require an operating voltage of 12 volts while the logic circuitry used in a computer may require an operating voltage of 5 volts. A power supply is used by a computer system to supply the needed DC voltages. Though power supplies used in computer systems may be linear or switching power supplies, a switched-mode power supply is typically employed due to its size and efficiency. Regardless the type, conventional computer power supplies usually are built to conform to the ATX form factor.

A conventional computer power supply may be a switched-mode power supply designed to convert a main 110-240 V AC power supply to several output DC voltages (both positive and negative) in the range of 12 volts to 3.3 volts to cover the diverse output voltages that are needed. The different voltage requirements and varying load (current draw) requirements can create problems when supplied from the same power supply. As such, power supplies may deliver power on multiple voltage rails that are independent of each other. This may be done using multiple power supplies that produce one voltage component at a single voltage rail or with a single power supply that produces voltage components on independent voltage rails. Since power supplies are essential to the operation of computer systems, the art would benefit from an improved power supply.

SUMMARY

One aspect provides an AC/DC power supply. In one embodiment, the AC/DC power supply includes: (1) a transformer having a primary winding couplable to an AC power source and a secondary winding inductively couplable to the primary winding and (2) multiple DC voltage rails coupled to the secondary winding at designated locations and configured to deliver power to loads coupled thereto, each of the DC voltage rails configured to dynamically transfer there between an available portion of the power in response to changes in the loads.

In yet another aspect, a method of delivering DC power at multiple voltages is disclosed. In one embodiment, the method includes: (1) receiving a primary power supply, (2) converting the primary power supply to a secondary power supply (3) providing power at a first DC voltage rail employing the secondary power supply, (4) providing power at a second DC voltage rail employing the secondary power supply and (5) dynamically transferring available power between the first DC voltage rail and the second DC voltage rail in response to loads coupled to the first DC voltage rail and the second DC voltage rail.

In still another aspect, a computer data storage system is disclosed. In one embodiment, the computer data storage system includes: (1) multiple disk drives configured to store data, (2) a data interface configured to provide access to the disk drives for writing and reading data and (3) an AC/DC power supply configured to provide DC power for the computer data storage system, having: (3A) a power interface configured to receive an AC primary power supply, (3B) a transformer having a primary winding couplable to the AC primary power supply via the power interface and a secondary winding inductively couplable to the primary winding and (3C) multiple DC voltage rails coupled to the secondary winding at designated locations and configured to deliver power to the multiple disk drives coupled thereto, each of the DC voltage rails configured to dynamically transfer therebetween an available portion of the power in response to changes in current requirements for the multiple disk drives.

BRIEF DESCRIPTION

Reference is now made to the following descriptions taken in conjunction with the accompanying drawings, in which.

DETAILED DESCRIPTION

Disclosed is a power supply that effectively utilizes generated power by allowing the dynamic transfer of power between one or more output voltage rails. The disclosed power supply is configured such that unused power available from one or more of the output voltage rails is utilized by other of the voltage rails that require additional power due to I/O loads. The voltage rails, therefore, are dependent voltage rails.

By employing dependent voltage rails, the disclosed power supply does not have to be designed to compensate for a total maximum power condition where each of the voltage rails are simultaneously loaded at peak load. Thus, a lower rated DC output power supply can be used by effectively using the full generated power. Since the disclosed power supply need not be designed for sum of individual maximum power of the voltage rails, the weight, volume and cost of the power supply needed can be reduced. The disclosed power supply can be employed in various computer systems including a data storage system.

Figure 1:
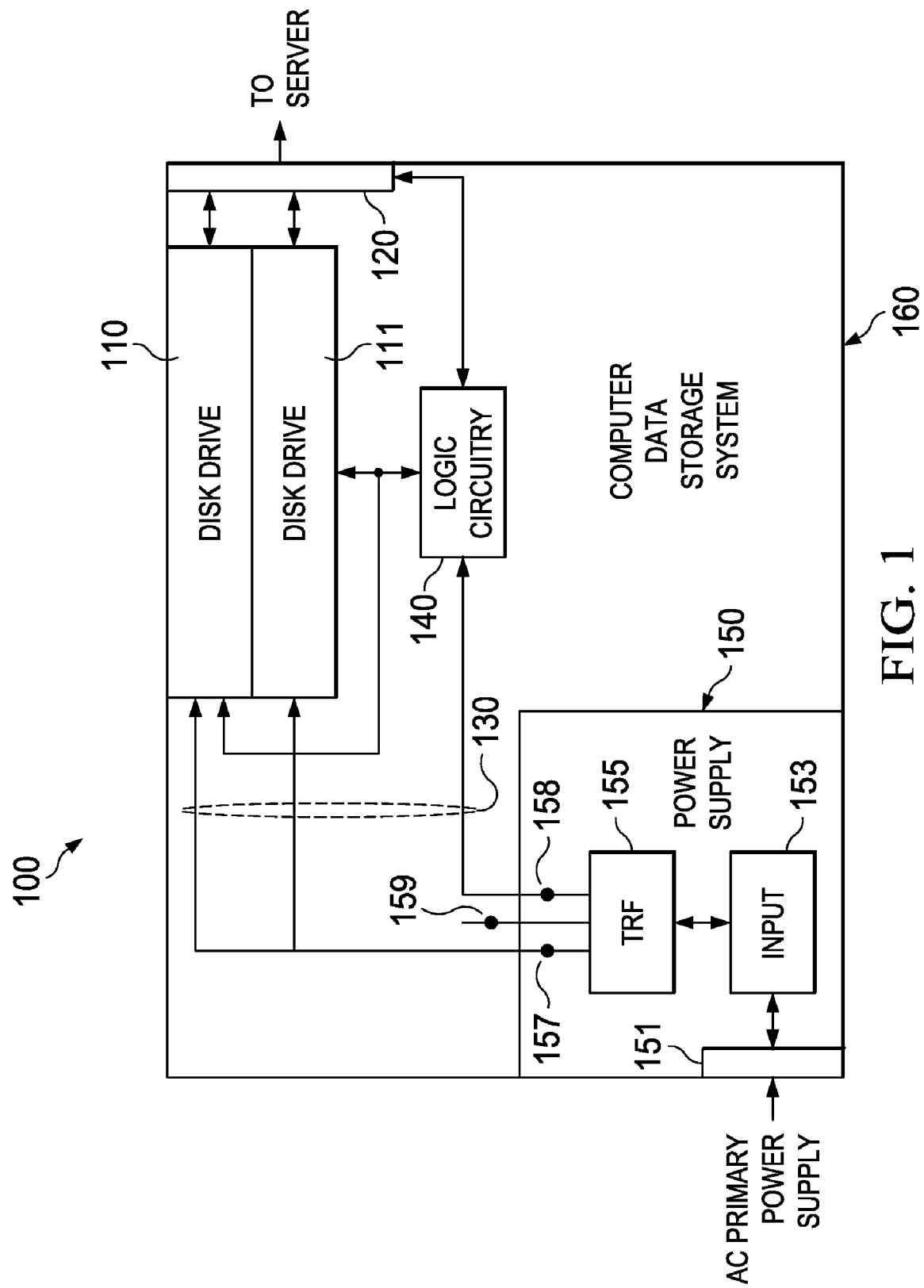
FIG. 1 is a block diagram of an embodiment of a data storage system constructed according to the principles of the present invention.

FIG. 1 is a block diagram of an embodiment of a computer data storage system 100 constructed according to the principles of the present invention. The computer data storage system 100 may be configured to store data for a computer or multiple computers. In the illustrated embodiment, the computer data storage system 100 is an external data storage system for a computer or computers. In one embodiment, the computer data storage system 100 may be a Redundant Array of Independent Disks (RAID) storage system.

The computer data storage system 100 includes multiple disk drives denoted 110 and 111, a data interface 120, a power bus 130, logic circuitry 140 and an AC/DC power supply 150. Additionally, the computer data storage system 100 includes an enclosure 160 that contains and protects each of the above devices. The enclosure 160 may be made of a rigid material including a plastic, a metal or a combination thereof.

Each of the multiple disk drives 110, 111, are conventional disk drives that are configured to store data. The disk drives 110, 111, may be part of a RAID storage system. Additionally, the disk drives 110, 111, may be of different types. The disk drives 110, 111, may employ a Small Computer System Interface (SCSI) (referred to as SCSI disk drives). In one embodiment, the disk drives 110, 111, may be serially connected as serial attached SCSI (SAS) disk drives.

The data interface 120 is configured to provide access to the disk drives 110, 111, for writing data thereon and reading data therefrom. The data interface 120 may be a conventional interface that allows the transfer of data. For example, the data interface 120 may include SCSI connections. In FIG. 1, the data interface 120 provides access between the disk drives 110, 111, and a server. In other embodiments, the data interface 120 may provide access to multiple servers or computers. A conventional cable may be used to couple the server to the data interface 120.

The power bus 130 is configured to couple the AC/DC power supply 150 to each individual one of the disk drives 110, 111, to deliver power thereto. The power bus 130 may be a conventional bus that is rated at the needed power. The power bus 130 may be a rigid metallic bus. In some embodiments, the power bus 130 may use cables to deliver power from the AC/DC power supply 150 to the disk drives 110, 111.

The logic circuitry 140 is configured to monitor the operation of the disk drives 110, 111. The logic circuitry 140 may be used, for example, to monitor the motors, the temperature and the reading and writing of data to the disk drives 110, 111. The logic circuitry 140 may provide monitoring information to the server via, for example, the data interface 120 or another conventional interface. The logic circuitry 140 is also coupled to the power bus 130 to receive power from the AC/DC power supply 150.

The AC/DC power supply 150 is configured to provide DC power for the computer data storage system 100 including the disk drives 110, 111, and the logic circuitry 140. The AC/DC power supply 150 is coupled to and configured to employ the power bus 130 to deliver power throughout the computer data storage system 100. The AC/DC power supply 150 includes a power interface 151, a power input 153, a transformer 155 and multiple DC voltage rails denoted as 157 and 158.

The power interface 151 is configured to receive an AC primary power supply. The AC primary power supply may be the standard voltage delivered at a wall outlet. In some embodiments, the AC primary power supply may be 120 volts or 240 volts. The power interface 151 may be a conventional interface used in computer systems to receive a primary AC voltage. The power interface 151 may comply with the ATX form factor. A power cord may be used to couple the power interface 151 to the AC primary power supply (e.g., a wall outlet).

The power input 153 is configured to receive the AC primary power supply, process the power supply and provide the processed power to the transformer 155. For example, in one embodiment the AC/DC power supply is a switched mode power supply. As such, the power input 153 includes a rectifier that converts the AC primary power supply to a DC voltage and a high-speed switch that slices this DC voltage before providing it to the primary of the transformer 155. After the secondary of the transformer 155, the AC voltage is again rectified to DC. The transformer 155, therefore, has a primary winding couplable to the AC primary power supply via the power input 153 and the power interface 151. Additionally, the transformer 155 includes the secondary winding inductively couplable to the primary winding.

The multiple DC voltage rails 157, 158, are coupled to the secondary winding at designated locations and configured to deliver power to the computer data storage system 100 employing the power bus 130. Each of the DC voltage rails 157, 158, are configured to dynamically transfer therebetween an available portion of the power thereon in response to changes in current requirements for the load connected to each of the DC voltage rails 157, 158.

For example, the DC voltage rails 157, 158, are tapped to the secondary of the transformer 155 at different locations to provide a desired voltage. DC voltage rail 157 is tapped to provide a DC voltage of 12 volts and DC voltage rail 158 is tapped to provide a DC voltage of 3 volts. In other embodiments, other DC voltages may be provided by the DC voltage rails 157, 158. Additionally, more than two DC voltage rails may be coupled to the secondary to provide distinct voltages. For example, another DC voltage rail designated 159 may be coupled to the secondary to deliver 5 volts in addition to the DC voltage rails 157, 158. For further discussion, DC voltage rails 157 and 158 will be referred to with the understanding that DC voltage rail 159 is configured similarly and may also be used to dynamically transfer power.

Each of the DC voltage rails 157, 158, includes an AC-to-DC converter that is employed to convert the AC power from the secondary to the DC voltages of 12 volts and 3 volts, respectively. Each of the AC-to-DC converters may be conventional converters including a rectifier and a filter.

Dynamic transfer of power between the two DC voltage rails 157, 158, may occur when the disk drives 110 or 111 need current for an input or output operation and the logic circuitry 140 does not presently need all power available on DC voltage rail 158. The increased current requirement for the input or output operation increases the power provided via the DC voltage rail 157 by using the available power from the DC voltage rail 158. A more detail illustration and operation description of an AC/DC power supply constructed according to the invention is disclosed in FIG. 2.

Figure 2:
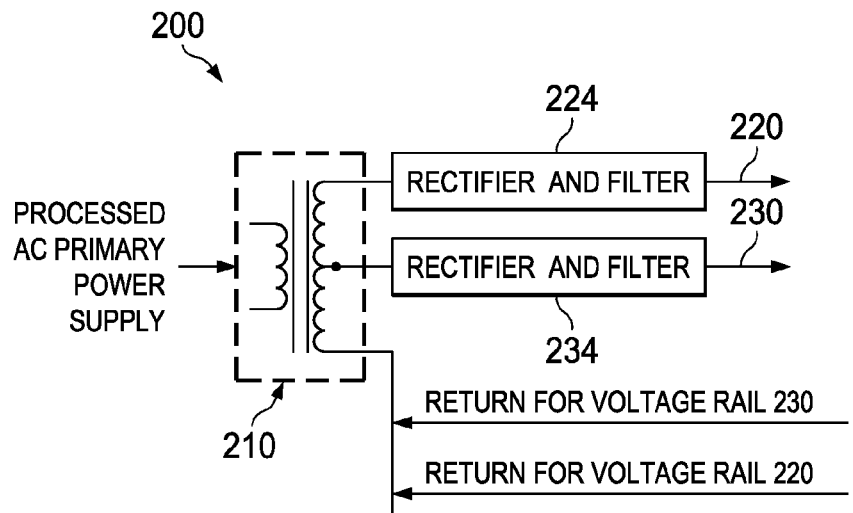
FIG. 2 is a block diagram of an embodiment of a switched mode power supply constructed according to the principles of the present invention.

FIG. 2 is a block diagram of an embodiment of a switched mode power supply 200 constructed according to the principles of the present invention. The switched mode power supply 200 includes a transformer 210, a DC voltage rail 220 and a DC voltage rail 230. The transformer 210 includes a primary winding and a secondary winding inductively coupled to the primary winding. The switched mode power supply 200 may also include additional components typically included in a switched mode power supply, such as: an input rectifier and filter that converts the AC primary power supply to a DC voltage, and a switch that slices the DC voltage and provides it to the primary winding of the transformer 210.

The DC voltage rails 220, 230, are coupled to the secondary winding at designated locations and configured to deliver power to loads coupled thereto. Each of the DC voltage rails 220, 230, are configured to dynamically transfer therebetween an available portion of the power in response to changes in the loads. The loads may be data storage disk drives or logic circuitry. Thus, the DC voltage rail 220 may use a portion of the power delivered by the DC voltage rail 230 according to a current requirement of a load coupled to the DC voltage rail 220.

Each of the DC voltage rails 220, 230, includes an AC-to-DC converter 224, 234, that is employed to convert AC power at the secondary winding to DC power. The AC-to-DC converters 224, 234, include a rectifier and a filter that are used for the conversion.

Following is an example illustrating the difference between the switched mode power supply 200 and a conventional power supply that has independent outputs. For the example, consider the conventional power supply has a first DC voltage rail rated at a maximum power of 37 amps at 12 volts and a second DC voltage rail rated at a maximum power of 38 amps at 5 volts. As such, the conventional power supply having these current requirements would be rated at 634 W DC output.

Utilizing dependent DC voltage rails, the switched mode power supply 200 can be DC output rated at 559 W and still provide maximum load current at DC voltage rail 220, 230, when needed. For the example, DC voltage rail 220 is rated at a maximum power of 37 amps at 12 volts and the DC voltage rail 230 is rated at a maximum power of 38 amps at 5 volts. When 12V is loaded for a maximum load current of 37 A on DC voltage rail 220, the load current on DC voltage rail 230 at 5V shall not exceed 23 A. Additionally, when 5V is loaded for a maximum load current of 38 A on DC voltage rail 230, the load current on DC voltage rail 220 at 12V shall not exceed 26 A. Thus, dependently coupling the DC voltage rails 220, 230, to the transformer secondary can result in a reduction of 75 W on the rated DC output compared to a conventional power supply having independent voltage rails. The switched mode power supply 200, however, is still configured to allow the I/O load types and thresholds that are voltage rail dependent and driven by the current requirements that are in the conventional 634 W DC output option of the example.

Figure 3:
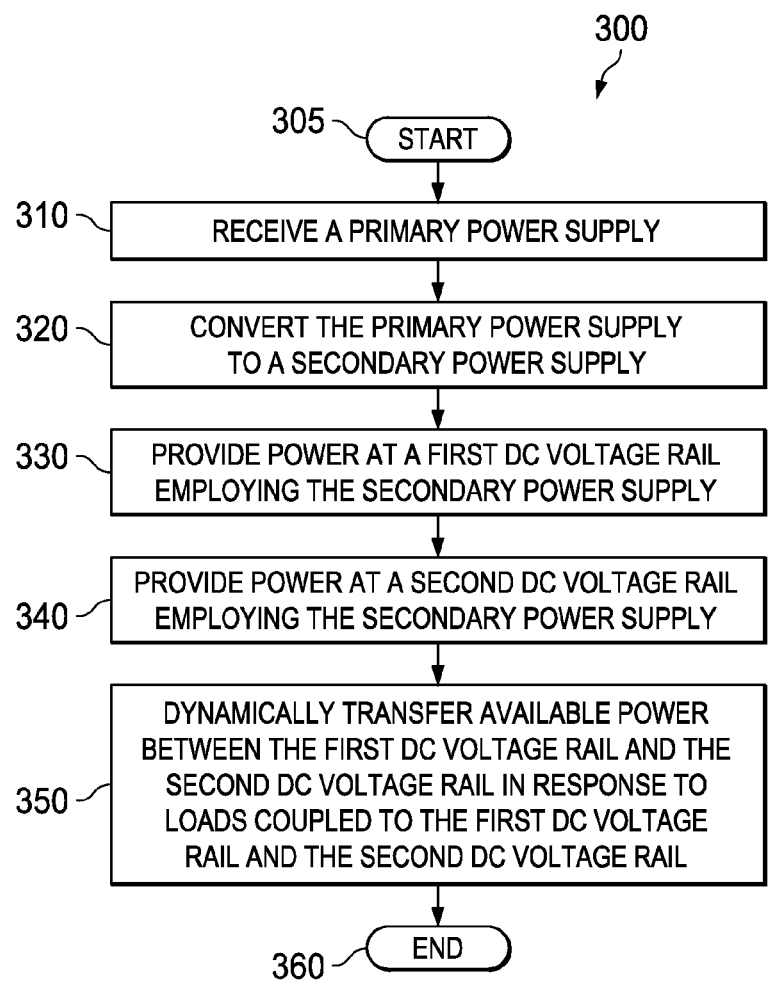
FIG. 3 is a flow diagram of an embodiment of a method of delivering DC power at multiple voltages carried out according to the principles of the present invention.

FIG. 3 is a flow diagram of an embodiment of a method of delivering DC power at multiple voltages carried out according to the principles of the present invention. The method 300 begins in a step 305.

In a step 310, a primary power supply is received. The primary power supply may be received from a wall outlet or a power strip via a power cord. The primary power supply is then converted to a secondary power supply in a step 320. A switched mode power conversion may be employed for receiving the primary power supply and converting the primary power supply to a secondary power supply.

In a step 330, power is provided at a first DC voltage rail employing the secondary power supply. In a step 340, power is provided at a second DC voltage rail employing the secondary power supply. Providing power at the first DC voltage rail and at the second DC voltage rail includes converting AC power to DC power. For the converting, the first and second DC voltage rails may employ a rectifier and a filter.

Available power is dynamically transferred between the first DC voltage rail and the second DC voltage rail in response to loads coupled to the first DC voltage rail and the second DC voltage rail in a step 350. Dynamically transferring may include increasing the power at the first DC voltage rail by reducing the DC power at the second DC voltage rail in response to a current requirement of a load coupled to the first DC voltage rail. Additionally, dynamically transferring power may include increasing the power at the second DC voltage rail by reducing the power at the first DC voltage rail in response to a current requirement of a load coupled to the second DC voltage rail. The loads of the DC voltage rails may be data storage disk drives of, for example, a RAID storage system. Additionally, the loads may be logic circuitry of the RAID storage system. Alternatively, the loads may be logic circuitry of a RAID controller that directs the reading and writing of data to the multiple disk drives of the RAID storage system. The RAID controller may be located in a server coupled to the multiple disk drives.

Those skilled in the art to which this application relates will appreciate that other and further additions, deletions, substitutions and modifications may be made to the described embodiments.

What is claimed is:

1. An AC/DC power supply, including:
   a transformer having a primary winding couplable to an AC power source and a single secondary winding inductively couplable to said primary winding; and
   multiple DC voltage rails coupled to said secondary winding at designated locations and configured to deliver power to loads coupled thereto, each of said DC voltage rails dependently coupled to said secondary winding to dynamically transfer therebetween an available portion of said power in response to changes in said loads.

2. The AC/DC power supply as recited in claim 1 wherein each of said DC voltage rails includes an AC-to-DC converter that is employed to provide said power.

3. The AC/DC power supply as recited in claim 2 wherein each of said AC-to-DC converters include a rectifier and a filter.

4. The AC/DC power supply as recited in claim 1 wherein said AC/DC power supply is a switched mode power supply.

5. The AC/DC power supply as recited in claim 1 wherein said loads are data storage disk drives.

6. The AC/DC power supply as recited in claim 1 wherein there are two of said multiple DC voltage rails.

7. The AC/DC power supply as recited in claim 6 wherein a first one of said DC voltage rails lines is configured to use a portion of said power associated with a second one of said DC voltage lines according to a current requirement of a load coupled to said first DC voltage line.

8. A method of delivering DC power at multiple voltages, comprising:
   receiving a primary power supply;
   converting said primary power supply to a secondary power supply;
   providing power at a first DC voltage rail employing said secondary power supply;
   providing power at a second DC voltage rail employing said secondary power supply, wherein said first DC voltage rail and said second DC voltage rail are dependent voltage rails; and
   dynamically transferring available power between said first DC voltage rail and said second DC voltage rail in response to loads coupled to said first DC voltage rail and said second DC voltage rail.

9. The method as recited in claim 8 wherein said providing said power at said first DC voltage rail and at said second DC voltage rail includes converting AC power to DC power.

10. The method as recited in claim 8 wherein said receiving and said converting are performed by a switched mode power supply.

11. The method as recited in claim 8 wherein said loads are data storage disk drives.

12. The method as recited in claim 8 wherein said dynamically transferring includes increasing said power at said first DC voltage rail by reducing said DC power at said second DC voltage rail in response to a current requirement of a load coupled to said first DC voltage rail.

13. The method as recited in claim 8 wherein said dynamically transferring includes increasing said power at said second DC voltage rail by reducing said power at said first DC voltage rail in response to a current requirement of a load coupled to said second DC voltage rail.

14. A computer data storage system, comprising:
multiple disk drives configured to store data;
a data interface configured to provide access to said disk drives for writing and reading data; and
an AC/DC power supply configured to provide DC power for said computer data storage system, including:
- a power interface configured to receive an AC primary power supply;
- a transformer having a primary winding couplable to said AC primary power supply via said power interface and a single secondary winding inductively couplable to said primary winding; and
- multiple DC voltage rails coupled to said secondary winding at designated locations and configured to deliver power to said multiple disk drives coupled thereto, each of said DC voltage rails dependently coupled to said secondary winding to dynamically transfer therebetween an available portion of said power in response to changes in current requirements for said multiple disk drives.

15. The data storage system as recited in claim 14 wherein each of said DC voltage rails includes an AC-to-DC converter that is employed to provide said power.

16. The data storage system as recited in claim 15 wherein each of said AC-to-DC converters includes a rectifier and a filter.

17. The data storage system as recited in claim 14 wherein said AC/DC power supply is a switched mode power supply.

18. The data storage system as recited in claim 14 wherein said data storage system is a RAID data storage system.

19. The data storage system as recited in claim 14 wherein there are two of said multiple DC voltage rails.

20. The data storage system as recited in claim 14 wherein said multiple DC voltage rails are dependently coupled to each other via said secondary winding.

* * * * *